United States Patent
Chang

(10) Patent No.: US 11,524,611 B2
(45) Date of Patent: Dec. 13, 2022

(54) SEAT RECLINING DEVICE

(71) Applicant: HYUNDAI TRANSYS INCORPORATED, Seosan-si (KR)

(72) Inventor: Seung Hun Chang, Hwaseong-si (KR)

(73) Assignee: HYUNDAI TRANSYS INCORPORATED, Seosan-si (KR)

( * ) Notice: Subject to any disclaimer, the term of this patent is extended or adjusted under 35 U.S.C. 154(b) by 0 days.

(21) Appl. No.: 17/369,304

(22) Filed: Jul. 7, 2021

(65) Prior Publication Data
US 2022/0111773 A1 Apr. 14, 2022

(30) Foreign Application Priority Data

Oct. 14, 2020 (KR) ........................ 10-2020-0132717

(51) Int. Cl.
*B60N 2/225* (2006.01)

(52) U.S. Cl.
CPC .................................. *B60N 2/2252* (2013.01)

(58) Field of Classification Search
CPC ........................... B60N 2/2356; B60N 2/2252
See application file for complete search history.

(56) References Cited

U.S. PATENT DOCUMENTS

| 10,610,018 B1 * | 4/2020 | Madhu .................. A47C 1/027 |
| 2015/0367758 A1 | 12/2015 | Chang | |
| 2018/0361886 A1 * | 12/2018 | Chang .................. B60N 2/2356 |
| 2019/0337424 A1 * | 11/2019 | Chang ...................... B60N 2/20 |
| 2022/0104621 A1 * | 4/2022 | Hur ......................... A47C 1/025 |
| 2022/0144150 A1 * | 5/2022 | Teraguchi ............ B60N 2/2356 |

FOREIGN PATENT DOCUMENTS

| CN | 102481862 A | * | 5/2012 | ............. B21D 53/28 |
| CN | 103082707 A | * | 5/2013 | ........... B60N 2/2252 |
| CN | 113147533 A | * | 7/2021 | |
| EP | 2586650 A2 | * | 5/2013 | ........... B60N 2/2252 |
| FR | 3081006 A1 | * | 11/2019 | |
| JP | 2013-094375 A | | 5/2013 | |
| JP | 2014-040133 A | | 3/2014 | |
| KR | 102070023 B1 | * | 1/2020 | |
| KR | 10-2020-0064262 A | | 6/2020 | |
| WO | WO-2014086824 A1 | * | 6/2014 | ........... B60N 2/2252 |

OTHER PUBLICATIONS

Pascal Hytrowski, "European Search Report for EP No. 21193774.3", dated Mar. 7, 2022, EPO, Germany.

* cited by examiner

*Primary Examiner* — Timothy J Brindley
(74) *Attorney, Agent, or Firm* — Novick, Kim & Lee PLLC; Jae Youn Kim

(57) ABSTRACT

Proposed is a seat reclining device having a mobile flange that includes: a gear unit having an internal gear; a collar provided at a center of the gear unit; and a flange part connecting the collar and the gear unit to each other, and that is configured such that a radial cross-section of the flange part circumferentially repeatedly changes.

9 Claims, 7 Drawing Sheets

SEAT RECLINING DEVICE

CROSS REFERENCE TO RELATED APPLICATION

The present application claims priority to Korean Patent Application No. 10-2020-0132717, filed Oct. 14, 2020, the entire contents of which is incorporated herein for all purposes by this reference.

BACKGROUND OF THE INVENTION

Field of the Invention

The present invention relates to a seat reclining device structure that is mounted on a vehicle.

Description of the Related Art

A seat reclining device is mounted on a seat in a vehicle, etc., adjusts the angle of a seatback with respect to a seat cushion, and maintains the adjusted angle of the seatback, thereby improving convenience for the person in the seat.

According to the reclining device, a gear plate is fixed to a seat cushion, a mobile flange is fixed to a seatback, and the gear plate and the mobile flange constitute a cycloid reducer by being eccentrically engaged with each other. Accordingly, the eccentric position of the mobile flange with respect to the gear plate is rotated by a rotational force input through an input device, so the mobile flange is rotated with respect to the gear plate, whereby the angle of the seat back can be adjusted with respect to the seat cushion.

Further, a cam elastically supported by a spring is inserted between the gear plate and the mobile flange and can be moved when the input device is rotated. Accordingly, it is possible to change the eccentric position of the mobile flange with respect to the gear plate by moving the cam using the rotational force input to the input device, but it is impossible to move the cam using the rotational force input to the mobile flange. Accordingly, the eccentric position of the mobile flange with respect to the gear plate is stably fixed, and thus, the adjusted angle of the seatback can be stably maintained.

The mobile flange has a collar at the center in which the input device is inserted. When the eccentric position of the mobile flange with respect to the gear plate is rotated, the input device rotates and revolves in the collar, so strong strength and durability should be secured for the collar of the mobile flange.

The description provided above as a related art of the present invention is just for helping understanding the background of the present invention and should not be construed as being included in the related art known by those skilled in the art.

SUMMARY OF THE INVENTION

An objective of the present invention is to provide a seat reclining device that makes it possible to reduce the manufacturing cost by reducing a blank size when performing cold forging on a mobile flange, which is used for an automotive seat reclining device, that makes it possible to reduce the size and weight of the mobile flange, and that makes it possible to secure sufficiency strength and durability.

In order to achieve the objectives of the present invention, a seat reclining device includes a mobile flange that includes: a gear unit having an internal gear; a collar provided at a center of the gear unit; and a flange part connecting the collar and the gear unit to each other, and that is configured such that a radial cross-section of the flange part circumferentially repeatedly changes.

In a radial cross-section of the flange part of the mobile flange, an inclined portion forming an inclined surface gradually protruding in a direction opposite to a protruding direction of the collar as radially going toward the collar from the gear unit, and a plane portion being perpendicular to a central axis of the mobile flange as radially going toward the collar from the gear unit may be circumferentially repeatedly disposed.

The plane portion may be formed toward the collar from the gear unit, and a protrusion recovery portion gradually protruding to the same height as a protruding height of the inclined portion may be connected to an end of the plane portion adjacent to the collar.

Both circumferential sides of the inclined portion may form a triangular plane having two sides meeting the plane portion and the protrusion recovery portion; and an apex formed by the plane portion and the protrusion recovery portion meeting each other of the triangular plane may be formed at a position positioned outside the inclined portion farther than a position of an opposite side of the apex, so the triangular plane may be formed in a shape increasing a width of the inclined portion.

In order to achieve the objectives of the present invention, a mobile flange includes: a gear unit having an internal gear; a collar provided at a center of the gear unit; and a flange part connecting the collar and the gear unit to each other, in which the flange part has a plurality of inclined portions protruding in a direction to a protruding direction of the collar as going to a center from the gear unit, on a surface opposite to the collar.

A plurality of inclined portions of the flange part may be radially disposed from a portion where the collar is formed in a circumferential direction of the flange part.

The inclined portions of the flange part may be elongated and protruded in a radial direction of the flange part.

Plane portions forming planes perpendicular to a central axis of the mobile flange may be formed between the inclined portions of the flange part.

Protrusion recovery portions gradually protruding to the same height as protruding heights of the inclined portions at the portion where the collar is formed may be connected to the plane portions of the flange part.

The inclined portions may be configured such that portions where the inclined portions and the plane portions meet each other and portions where the inclined portions and the protrusion recovery portions meet each other gradually widen toward portions where the plane portions and the protrusion recovery portions are connected to each other.

According to the present invention, it is possible to reduce the manufacturing cost by reducing a blank size when performing cold forging on a mobile flange, which is used for an automotive seat reclining device, it is possible to reduce the size and weight of the mobile flange, and it is possible to secure sufficiency strength and durability.

BRIEF DESCRIPTION OF THE DRAWINGS

The above and other objectives, features and other advantages of the present invention will be more clearly understood from the following detailed description when taken in conjunction with the accompanying drawings, in which.

DETAILED DESCRIPTION OF THE INVENTION

Figure 1:
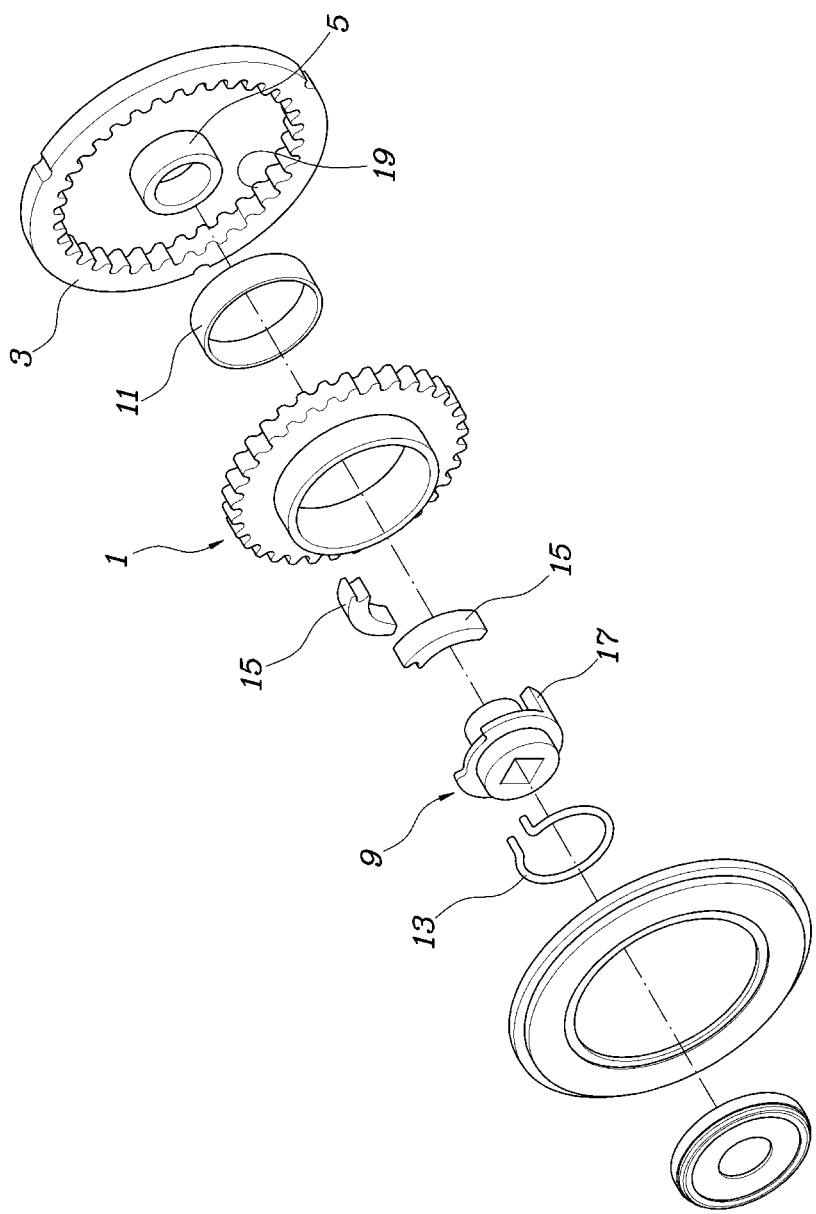
FIG. 1 is an exploded perspective view showing main components of a seat reclining device according to the present invention.

In the following description, the structural or functional description specified to exemplary embodiments according to the concept of the present invention is intended to describe the exemplary embodiments, so it should be understood that the present invention may be variously embodied, without being limited to the exemplary embodiments.

Embodiments described herein may be changed in various ways and various shapes, so specific embodiments are shown in the drawings and will be described in detail in this specification. However, it should be understood that the exemplary embodiments according to the concept of the present invention are not limited to the embodiments which will be described hereinbelow with reference to the accompanying drawings, but all of modifications, equivalents, and substitutions are included in the scope and spirit of the present invention.

It will be understood that, although the terms first and/or second, etc. may be used herein to describe various elements, these elements should not be limited by these terms. These terms are only used to distinguish one element, from another element. For instance, a first element discussed below could be termed a second element without departing from the right range of the present invention. Similarly, the second element could also be termed the first element.

It is to be understood that when one element is referred to as being "connected to" or "coupled to" another element, it may be connected directly to or coupled directly to another element or be connected to or coupled to another element, having the other element intervening therebetween. On the other hand, it should to be understood that when one element is referred to as being "connected directly to" or "coupled directly to" another element, it may be connected to or coupled to another element without the other element intervening therebetween. Further, the terms used herein to describe a relationship between elements, that is, "between", "directly between", "adjacent" or "directly adjacent" should be interpreted in the same manner as those described above.

The terminology used herein is for the purpose of describing particular embodiments only and is not intended to limit the present invention Singular forms are intended to include plural forms unless the context clearly indicates otherwise. It will be further understood that the terms "comprises" or "have" used in this specification, specify the presence of stated features, steps, operations, components, parts, or a combination thereof, but do not preclude the presence or addition of one or more other features, numerals, steps, operations, components, parts, or a combination thereof.

Unless otherwise defined, all terms including technical and scientific terms used herein have the same meaning as commonly understood by those skilled in the art to which the present invention belongs. It must be understood that the terms defined by the dictionary are identical with the meanings within the context of the related art, and they should not be ideally or excessively formally defined unless the context clearly dictates otherwise.

The present invention will be described hereafter in detail by describing exemplary embodiments of the present invention with reference to the accompanying drawings. Like reference numerals given in the drawings indicate like components.

Figure 2:
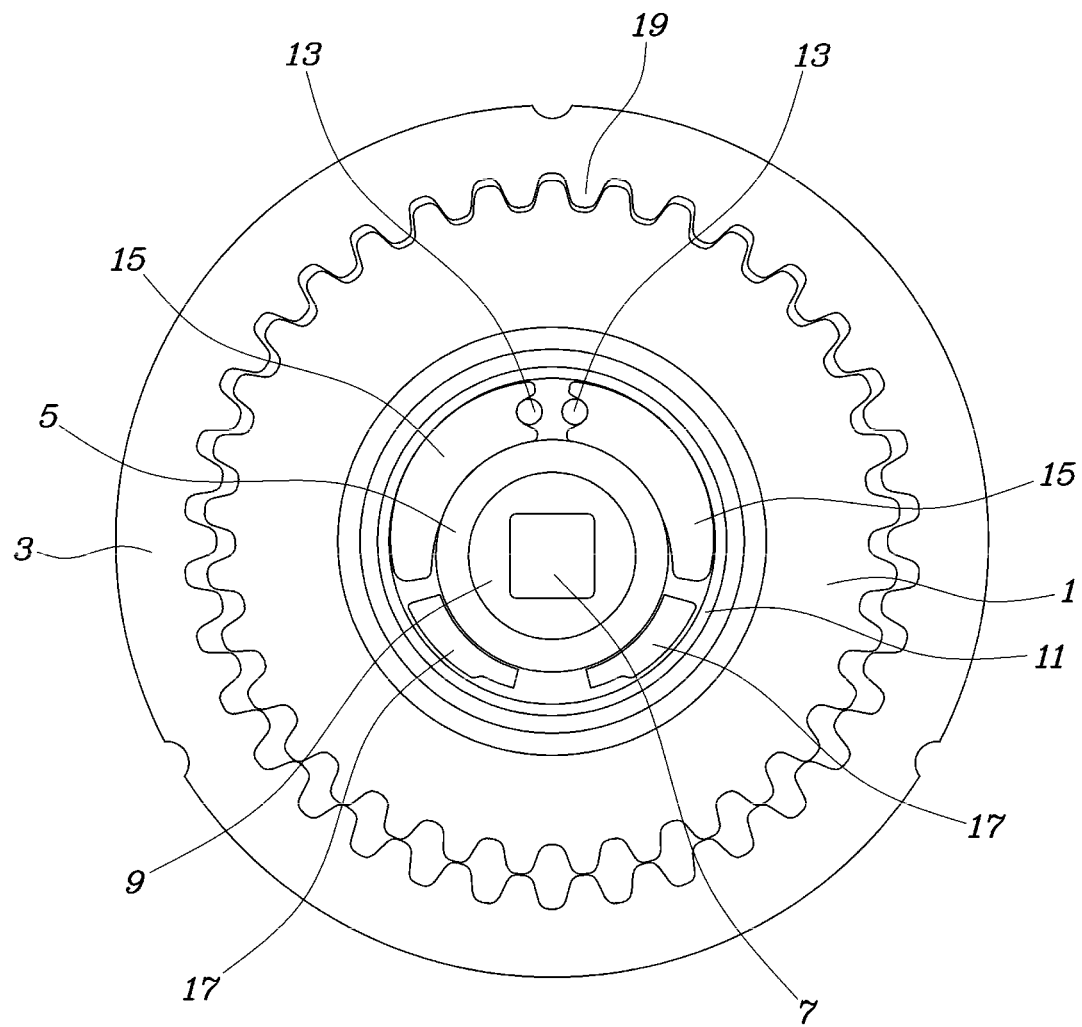
FIG. 2 is a view showing the state in which the main components of the seat reclining device according to the present invention have been combined.
Figure 3:
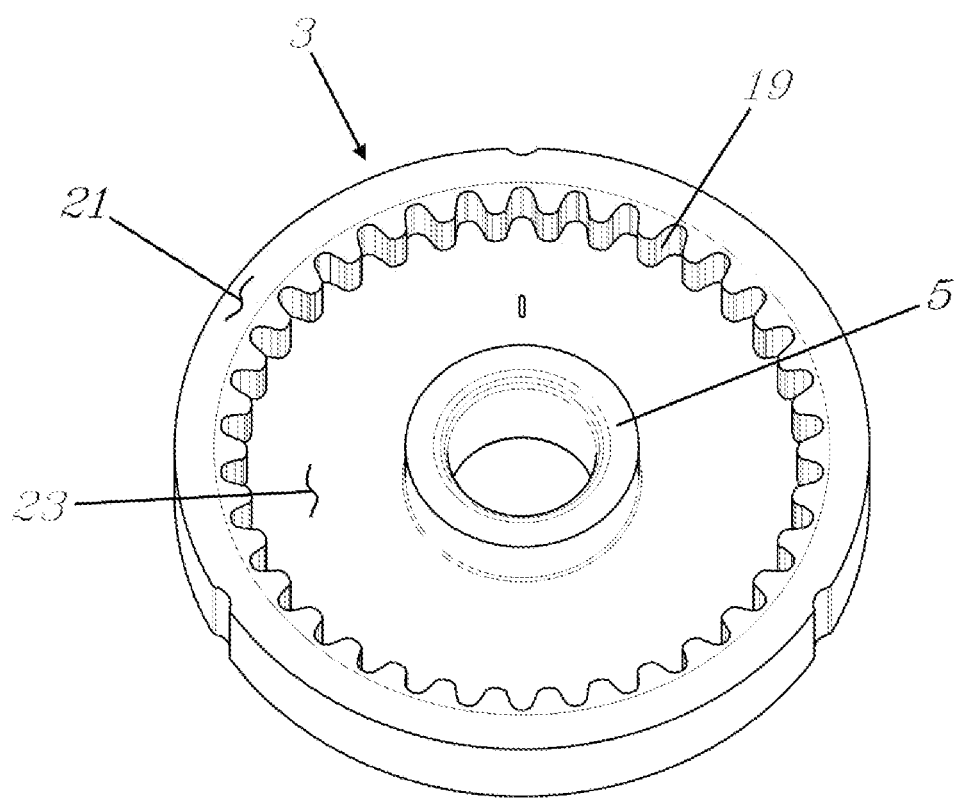
FIG. 3 is a view showing the front surface of a mobile flange according to the present invention.
Figure 4:
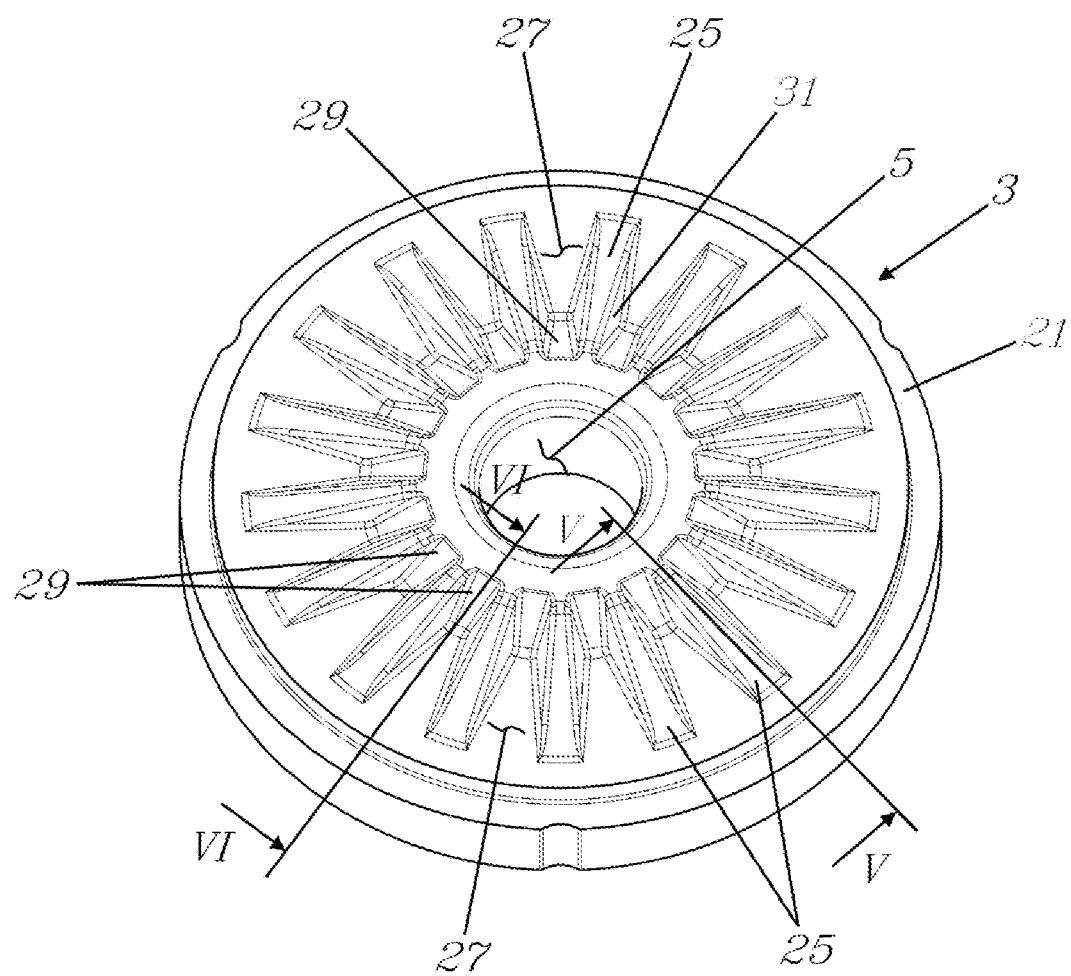
FIG. 4 is a view showing the rear surface of the mobile flange shown in FIG. 3.
Figure 5:
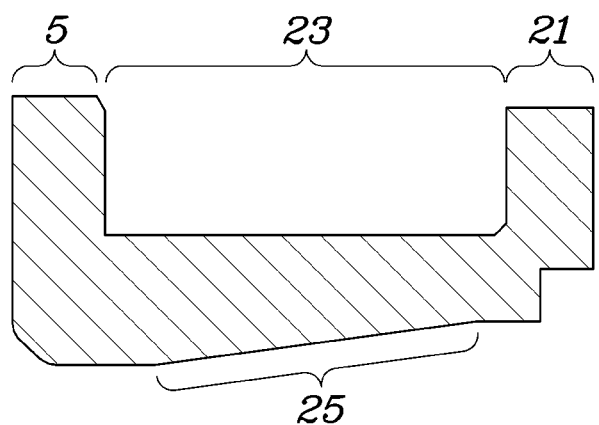
FIG. 5 is a cross-sectional view taken along line V-V of FIG. 4.
Figure 6:
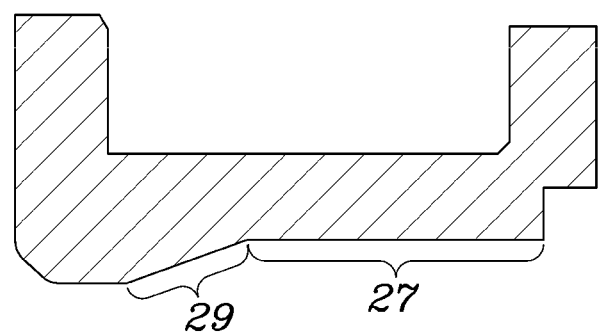
FIG. 6 is a cross-sectional view taken along the line VI-VI shown in FIG. 4.

Referring to FIGS. 1 and 2, a seat reclining device of the present invention includes: a gear plate 1 configured to be fixed to a seat cushion; a mobile flange 3 configured to be fixed to a seatback and constituting a cycloid reducer by being eccentrically engaged with the gear plate; an input device 9 rotatably inserted in a collar 5 of the mobile flange and receiving a rotational force from the outside through a rotary shaft 7; a bearing 11 inserted in the gear plate 11; and a cam 15 inserted between the bearing 11 and the collar 5 of the mobile flange 11 and supporting the eccentric state of the gear plate 1 and the mobile flange 3 using elasticity of a spring 13.

In order to rotate a seatback to a predetermined angel with respect to a seat cushion, when a rotational force is input to the input device 9 through the rotary shaft 7, device protrusions 17 of the input device 9 rotate the cam 15 by rotating, so the eccentric position of the mobile flange 3 with respect to the gear plate 1 is rotated, whereby reduction is performed. Accordingly, the mobile flange 3 is rotated with respect to the gear plate 1.

After the mobile flange 3 is rotated and the seatback is rotated at a desired angle of a person sitting in the seat, as described above, when the rotational force of the rotary shaft 7 is removed, the cam 15 fixes the eccentric position of the mobile flange 3 with respect to the gear plate 1 using the elasticity of the spring 13, whereby rotation between the mobile flange 3 and the gear plate 1 by a rotational force input from the mobile flange 3 is prevented. Accordingly, the adjusted angle of the seatback can be stably maintained.

The mobile flange 3 included in the seat reclining device of the present invention described above, as shown in FIGS. 3 to 6, includes a gear unit 21 having an internal gear 19, a collar 5 provided at the center of the gear unit 21, and a flange part connecting the collar 5 and the gear unit 21 to each other. The radial cross-section of the flange 23 is repeatedly circumferentially changed.

That is, in the radial cross-section of the flange part 23 of the mobile flange 3, an inclined portion 25 forming an inclined surface gradually protruding in a direction opposite to the protruding direction of the collar 5 as it radially goes toward the collar 5 from the gear unit 21, and a plane portion 27 being perpendicular to the central axis of the mobile flange 3 as it radially goes toward the collar 5 from the gear unit 21 are circumferentially repeatedly disposed.

That is, assuming that the direction in which the collar 5 of the mobile flange 3 is formed is the front surface and the opposite direction is the rear surface, a plurality of inclined portions 25 are formed on the rear surface of the flange part 23 to protrude as they go to the center from the gear unit 21.

As shown in the figures, the plurality of inclined portions 25 of the flange part 23 are radially disposed from the portion, where the collar 5 is provided, in the circumferential direction of the flange part 23, and are elongated and protruded in the radial direction of the flange part 23.

The plane portions 27 provided between the inclined portions 25 of the flange part 23 are formed toward the collar 5 from the gear unit 21, and protrusion recovery portions 29 gradually protruding to the same height as the protruding heights of the inclined portions 25 are connected to the ends of the plane portions 27 adjacent to the collar 5.

Accordingly, a smooth circular surface is provided at the portion where the collar 5 is connected to the flange part 23, whereby it is possible to strongly support the collar 5.

Both circumferential sides of the inclined portion 25 form a triangular plane 31 having two sides meeting the plane portion 27 and the protrusion recovery portion 29. The apex formed by the plane portion 27 and the protrusion recovery portion 29 meeting each other of the triangular plane 31 is formed at a position positioned outside the inclined portion 25 farther than the position of the opposite side of the apex, so the triangular plane 31 is formed in a shape increasing the width of the inclined portion 25.

That is, the inclined portion 25 is configured such that the portion where the inclined portion 25 meets the plane portion 27 and the portion where the inclined portion 25 meets the protrusion recovery portion 29 gradually widen toward the portion where the plane portion 27 and the protrusion recovery portion 29 are connected to each other.

This shape increases the strength of the connection structure of the inclined portion 25 and the plane portion and enables the collar 5 to be more firmly and strongly supported by the inclined portion 25 and the protrusion recovery portion 29.

As described above, when the flange part 23 of the mobile flange 3 is formed by the plane portions 27, the inclined portions 25, and the protrusion recovery portions 29, it is possible to secure strength that can more firmly and strongly support the collar 5, as compared with when the flange part 23 is simply a plane. Accordingly, it is possible to ultimately improve durability of the mobile flange 3 and the seat reclining device.

In order to secure the strength for supporting the collar, unlike the present invention described above, it may be possible to consider that the entire rear surface of the flange part of the mobile flange protrudes and is composed of only inclined surfaces 33 without a plane portion.

Figure 7:
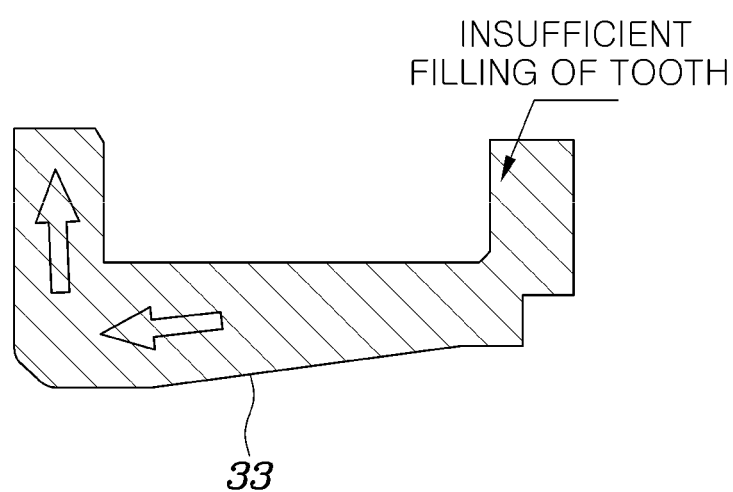
FIG. 7 is a view showing a cold forging process for a mobile flange having only an inclined portion without a plane portion.
Figure 8:
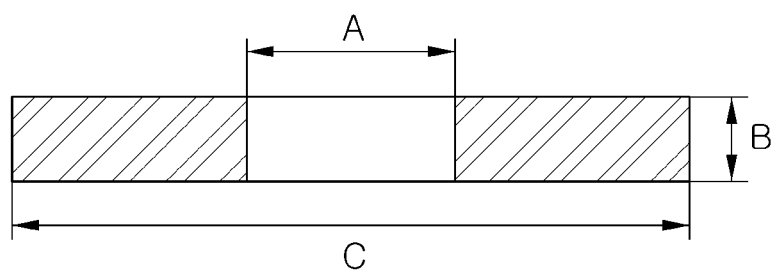
FIG. 8 is a view exemplifying a cross-section of a blank for manufacturing a mobile flange through the process shown in FIG. 7.

However, in this case, when the mobile flange is manufactured through cold forging, as shown in FIG. 7, the flesh of the material relatively quickly moves in the direction indicated by an arrow. Accordingly, it is required to manufacture the mobile flange 3 using a blank having a central hole of which the diameter A is large and the thickness B is also large, as shown in FIG. 8. In this case, the flesh for the gear unit 21 is insufficient, so the probability that the teeth of the internal gear 19 is insufficiently filled considerably increases.

When a thick blank is used, as described above, the manufacturing cost increases that much. Further, excessive surface pressure is generated in the mold, so the possibility of breakage of the mold increases.

Figure 9:
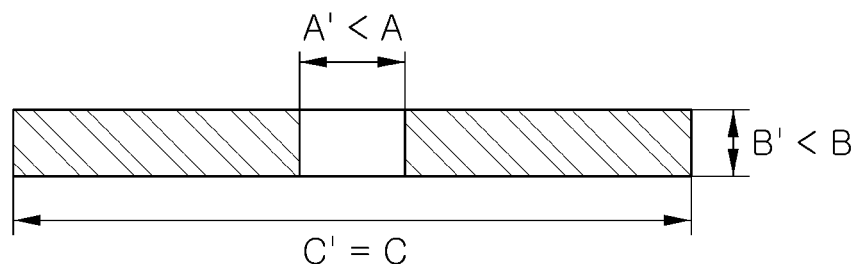
FIG. 9 is a view exemplifying a cross-section of a blank for manufacturing a mobile flange of the present invention to compare it with FIG. 8.

However, when the present invention described above is used, when the mobile flange 3 is manufactured through cold forging, excessive movement of the flesh due to the inclined portions 25 is prevented by the plane portions 27, whereby the teeth of the internal gear 19 is securely filled. Further, it is possible to use a blank of which the entire diameter is same C'=C, but the central hole has a diameter A' smaller than A, and the thickness B' is smaller than B, as shown in FIG. 9.

That is, when the structure of the mobile flange 3 according to the present invention is used, it is possible to more easily manufacture the mobile flange 3 using a blank of which the outer diameter is the same, but the thickness and the central hole are smaller. The strength for supporting the collar 5 of the mobile flange 3 can be secured by the inclined portions 25, so the durability of the mobile flange 3 and the entire seat reclining device can be improved. Further, since movement of the flesh of the material is appropriately controlled by the plane portions 27 when cold forging is applied to the mobile flange 3, it is possible to securely form the teeth of the internal gear 19 of the gear unit 21 and improve formability of the mobile flange 3.

Although the present invention was described with reference to specific embodiments shown in the drawings, it is apparent to those skilled in the art that the present invention may be changed and modified in various ways without departing from the scope of the present invention which is described in the following claims.

What is claimed is:

1. A seat reclining device comprising:
    a mobile flange comprising:
        a gear unit having an internal gear;
        a collar provided at a center of the gear unit; and
        a flange part connecting the collar and the gear unit to each other,
        wherein the mobile flange is configured such that a radial cross-section of the flange part circumferentially repeatedly changes,
        wherein, in the radial cross-section of the flange part of the mobile flange, an inclined portion forming an inclined surface gradually protruding in a direction opposite to a protruding direction of the collar as radially going toward the collar from the gear unit, and a plane portion being perpendicular to a central axis of the mobile flange as radially going toward the collar from the gear unit are circumferentially disposed.

2. The seat reclining device of claim 1, wherein the plane portion is formed toward the collar from the gear unit, and a protrusion recovery portion gradually protruding to a same height as a protruding height of the inclined portion is connected to an end of the plane portion adjacent to the collar.

3. The seat reclining device of claim 2, wherein two circumferential sides of the inclined portion form a triangular plane having two sides meeting the plane portion and the protrusion recovery portion; and
    an apex formed by the plane portion and the protrusion recovery portion meeting each other of the triangular plane is formed at a position outside the inclined portion farther than a position of an opposite side of the apex, such that the triangular plane is formed in a shape increasing a width of the inclined portion.

4. A mobile flange comprising:
    a gear unit having an internal gear;
    a collar provided at a center of the gear unit; and
    a flange part connecting the collar and the gear unit to each other,
    wherein the flange part has a plurality of inclined portions protruding in a direction to a protruding direction of the collar as going to a center from the gear unit, on a surface opposite to the collar.

5. The mobile flange of claim 4, wherein the plurality of inclined portions of the flange part are respectively radially disposed from a portion where the collar is formed in a circumferential direction of the flange part.

6. The mobile flange of claim 5, wherein the plurality of inclined portions of the flange part are respectively elongated and protruded in a radial direction of the flange part.

7. The mobile flange of claim 6, wherein plane portions forming planes perpendicular to a central axis of the mobile flange are provided between the plurality of inclined portions of the flange part.

8. The mobile flange of claim 7, wherein protrusion recovery portions gradually protruding to a same height as a protruding height of each of the plurality of inclined portions at the portion where the collar is provided are connected to the plane portions of the flange part.

9. The mobile flange of claim 8, wherein the plurality of inclined portions are configured such that portions where the plurality of inclined portions and the plane portions meet each other and portions where the plurality of inclined portions and the protrusion recovery portions meet each other gradually widen toward portions where the plane portions and the protrusion recovery portions are connected to each other.

* * * * *